United States Patent [19]

Li

[11] Patent Number: 5,052,738
[45] Date of Patent: Oct. 1, 1991

[54] SHADING COVER FOR MOTORCYCLES

[76] Inventor: Ming-Bin Li, 2-45, Lane 365, Chung Shan S. Rd., Yung Kang Shiang, Tainan Hsien, Taiwan

[21] Appl. No.: 703,731
[22] Filed: May 21, 1991
[51] Int. Cl.$^5$ ............................................. B60J 7/20
[52] U.S. Cl. .................................. 296/78.1; 296/136; 150/166
[58] Field of Search .................. 296/78.1, 136, 98; 150/166

[56] References Cited

U.S. PATENT DOCUMENTS

| 4,171,145 | 10/1979 | Pearson, Sr. | 296/136 |
| 4,715,646 | 12/1987 | Goffi et al. | 296/136 |
| 4,792,040 | 12/1988 | Wagstaff, III | 296/78.1 |
| 4,834,446 | 5/1989 | Tung-Chow | 296/136 |

FOREIGN PATENT DOCUMENTS 2088798  6/1982  United Kingdom .

Primary Examiner—Robert R. Song
Attorney, Agent, or Firm—Morton J. Rosenberg; David I. Klein

[57] ABSTRACT

A shading cover for motorcycles is to provide a box, a winding device and a canvas. The box being set on the rear seat of a motorcycle has an upper cover, a T-shaped block and a spring buckle. The winding device being inside the box is composed of a U-shaped block, a fixed shaft sleeve, a reel with a canvas, a spring, a left shaft sleeve, a right shaft sleeve, a cross bar and a push bar. The improvement is in the canvas which is rolled up onto the reel, and has a long flexible band sawn on the lower edge of the canvas, a long zipper with an additional canvas piece sawn on the upper front of the canvas, two short zippers with bags and rainhats sawn on the upper middle part of the canvas, and two canvas sleeves with short flexible bands placed on both sides of the canvas so that the canvas can be used as a sun shade and a raincoat.

1 Claim, 4 Drawing Sheets

5,052,738

SHADING COVER FOR MOTORCYCLES

BACKGROUND OF THE INVENTION

1. Field of the Invention

This invention relates to a shading cover for motorcycles which can be easily released from and rolled up into a box having a winding device. The shading cover being released and firmly covered on a motorcycle can be used as a sun shade in the sunny days. Moreover, the shading cover can also be put on a motorcyclist and his companion as a raincoat in the rainy days.

2. Description of the Prior Art

Nowadays, motorcycles are very popular with people for their convenience and rapidity. However, motorcycles being known and used in general still do not have any suitable apparatuses to prevent from the invasion of the sun and rain. Therefore, people often place their motorcycle under shady places such as corridors, or put some solid plates and simple plastic covers on their motorcycles. Nevertheless, these solid plates and simple plastic covers are very convenient for people to carry.

SUMMARY OF THE INVENTION

Therefore, it is the primary object of the present invention to provide a shading cover for motorcycles which can be easily released from and rolled up into a box having a winding device. It can be properly covered on a motorcycle or be put on a motorcyclist and his companion so as to keep out the scorching sun and to shelter from rain.

According to the preferred embodiment of the present invention having the object, there are some apparent advantages described as follows:

1. The shading cover having simple members is easy to be produced with little cost so that it is very competitive in the market.

2. The shading cover can be operated easily and rapidly.

3. A canvas being rolled up by a winding device is suitable to be a sun shade for a motorcycle in the sunny days and to be a raincoat for a motorcyclist and his companion in the rainy days.

4. The canvas has a long flexible band on its lower edge so that it can be properly covered and fixed on any required area of a motorcycle.

5. When rolling up the canvas, press a push bar leftwards so that a spring of the winding device will quickly roll up the released canvas.

BRIEF DESCRIPTION OF THE DRAWINGS

The invention will be better understood by referrence to the accompanying drawings, wherein.

DESCRIPTION OF THE PREFERRED EMBODIMENTS

Figure 1:
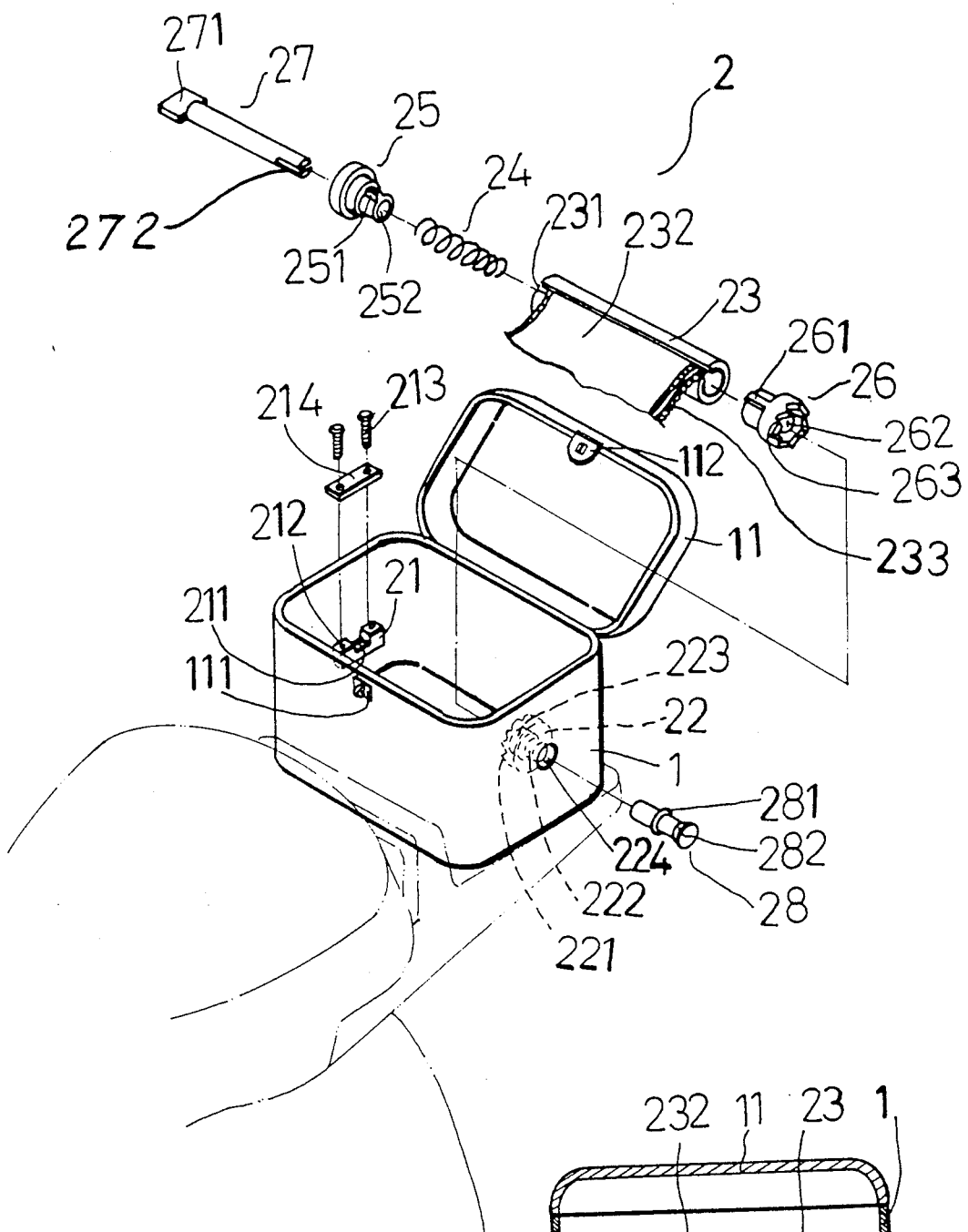
FIG. 1 is a perspective view showing the disassemblage of the winding device of the present invention.

As shown in FIG. 1, the present invention is concerned with a shading cover for motorcycles including a box 1, a winding device 2 and a canvas 232.

The box 1 being set on the rear seat of a motorcycle has an upper cover 11 on its top, a T-shaped block 111 on its front and a spring buckle 112 which is on the front of the upper cover 11 and just to the opposite side of the T-shaped block 111.

The winding device 2 has an U-shaped block 21 on the left inside wall of the box 1 and a fixed shaft sleeve 22 on the front inside wall of the box 1, by which an assemblage of a reel 23 with a canvas 232, a spring 24, a left shaft sleeve 25, a right shaft sleeve 26, a cross bar 27 and a push bar 28 can be firmly fixed between the U-shaped block 21 and the fixed shaft sleeve 22.

The U-shaped block 21 has a depression 211 on its center and screw holes 212 on its both sides.

Two screws 213 can penetrated into two holes of a stop plate 214 and then into the screw holes 212 so that the screws 23 can tightly screw the stop plate 214 to the U-shaped block 21.

The fixed shaft sleeve 22 has a gear teeth 221 on its top edge and an aperture 222 on its center. The aperture 222 has a depression 223 in its rear part and a conical groove 224 in its front part.

The reel 23 has an open slot 231 whose one side is connected to one end of the canvas 232.

The canvas 232 has a long flexible band 233 sawn on its lower edge. In the upper front of the canvas 232, there is a zipper 234 sawn with an additional canvas piece so as to enlarge the original area of the canvas 232. Moreover, in the upper middle part of the canvas 232, there are two zippers 235 having two bags 238 whose inside have two rainhats 237. In both sides of the canvas 232, there are two canvas sleeves 236 having their ends sawn with short flexible bands. In the upper rear part of the canvas 232, there is a gap 239.

The left shaft sleeve 25 and the right shaft sleeve 26 are set on both ends of the reel 23 respectively. The left shaft sleeve 25 being a cylinder with three different bored circular grooves has an aperture 252 on its center and a fixed strip 251 on the outside surface of the smallest bored circular groove. The right shaft sleeve 26 being a cylinder with two different bored circular grooves has a fixed strip 261 on the outside surface of the smaller bored circular groove. The bigger circular groove 262 of the right shaft sleeve 26 has gear teeth 263 on its top edge.

The cross bar 27 having a plate 271 on its left end and a flat clamp 272 on its right end can be penetrated into the spring 24 and then be fixed in the reel 23.

The push bar 28 having a circular flange 281 on its middle part and a conical flange 282 on its end can be fixed in the aperture 222 of the fixed shaft sleeve 22.

Figure 2:
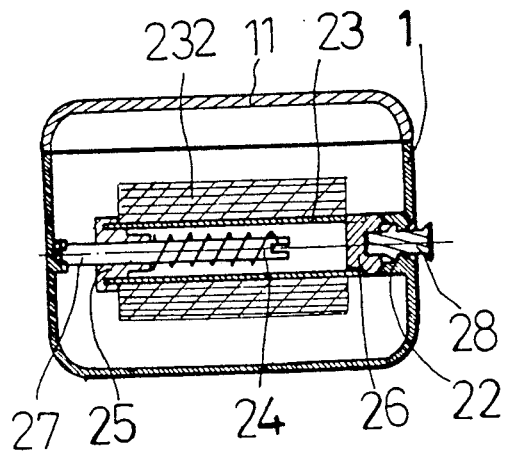
FIG. 2 is a sectional view showing the winding device of the present invention.

When assembling the winding device 2, first have the open slot 231 of the reel 23 been connected to one end of the canvas 232, as shown in FIGS. 1 and 2. Insert the cross bar 27 into the aperture 252 of the left shaft sleeve 25 and then hook the front of the spring 24 on the flat clamp 272 of the cross bar 27. At this moment, push the fixed strip 251 of the left shaft sleeve 25 into the left end of the open slot 231, and then also push the fixed strip 261 of the right shaft sleeve 26 into the right end of the open slot 231. And then, the reel 23 have been assembled with the cross bar 27, the spring, the left shaft sleeve 25 and the right shaft sleeve 26 can be firmly fixed between the U-shaped block 21 and the fixed shaft sleeve 22 because the plate 271 of the cross bar 27 is pressed in the depression 211 of the U-shaped block 21 by the stop plate 214 which has been screwed onto the screw holes 212 of the U-shaped block 21, and the gear teeth 263 of the right shaft sleeve 26 is also engaged to the gear teeth 221 of the fixed shaft sleeve 22, by which the reel 23 being fixed with the left shaft sleeve 25 and the right shaft sleeve 26 can turn clockwise and counterclockwise accordingly. Finally, press the push bar 28 into the aperture 221 of the fixed shaft sleeve 22 leftwards until the conical flange 282 of the push bar 28 touches to the end of the bigger circular groove 262 of the right shaft sleeve 26.

Figure 3:
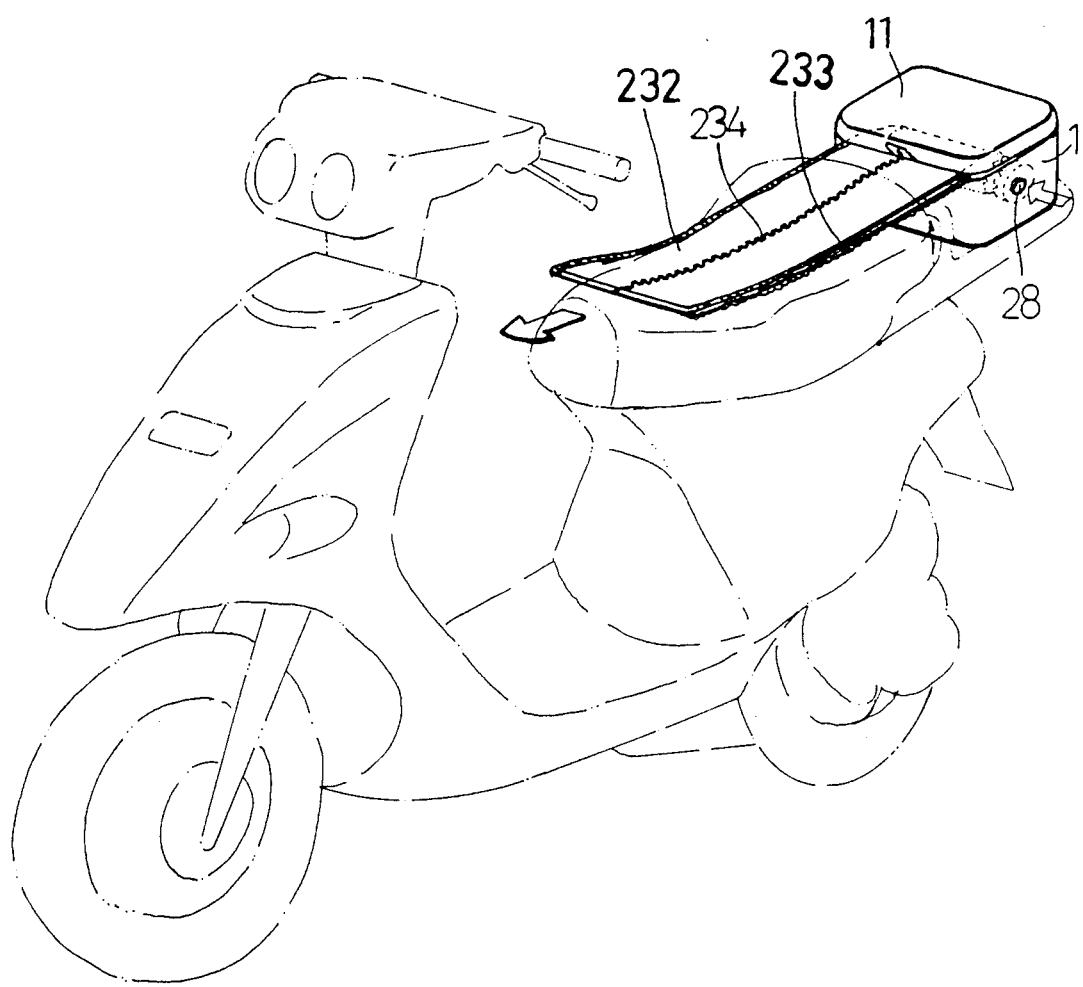
FIG. 3 is a view showing the released movement of the canvas of the present invention.
Figure 4:
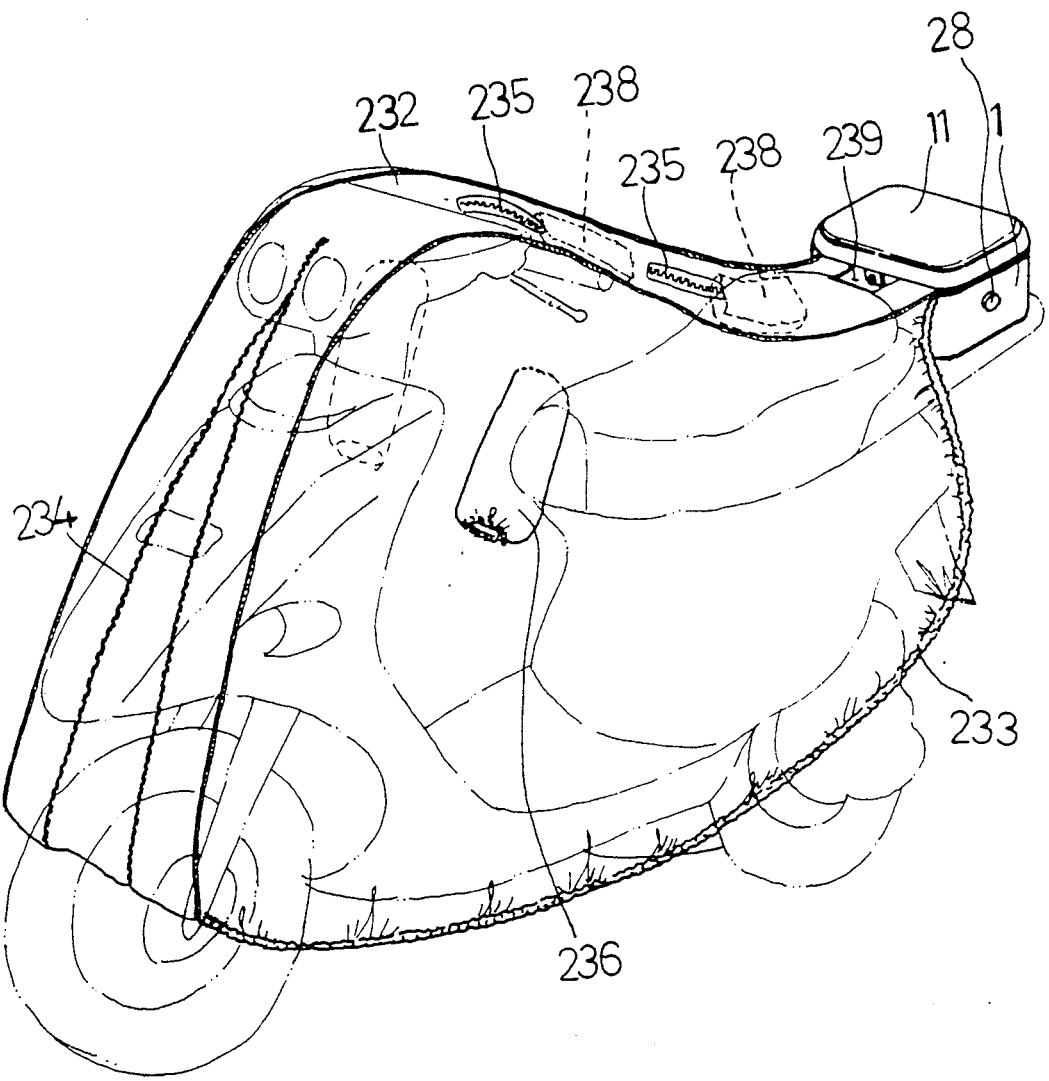
FIG. 4 is a view showing the canvas being used as a sun shade in a preferred embodiment of the present invention.

The design of the canvas 232 can be used as a sun shade and a raincoat. When the canvas 232 is used as a sun shade, pull the canvas 232 out of the winding device 2 of the box 1 until the length of the released canvas 232 is enough to cover a motorcycle, by which the gear teeth 263 of the right shaft sleeve 26 and the gear teeth 221 of the fixed shaft sleeve 22 can turn counterclockwise, as shown in FIG. 3. At this moment, the stopping moment of pulling the canvas will make the spring 24 of the reel 23 in a tight state and make the gear teeth 263 and 221 began to turn clockwise, by which the length of the canvas 232 can be firmly fixed. And then, stretch out the canvas 232 and the long flexible band 233 so as to completely cover the motorcycle, as shown in FIG. 4.

Figure 5:
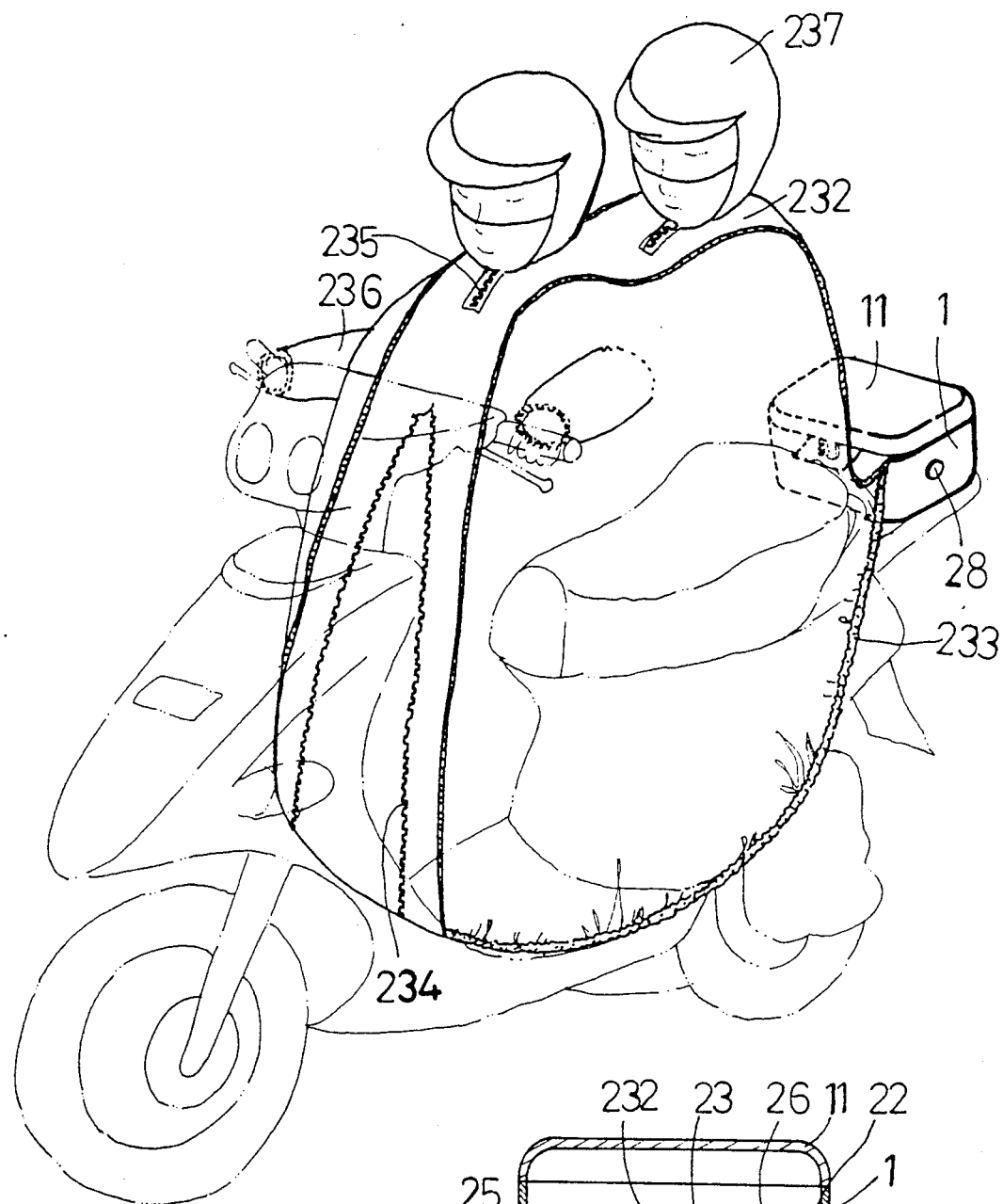
FIG. 5 is a view showing the canvas being used as a raincoat in another preferred embodiment of the present invention.

When the canvas 232 is used as a raincoat, pull the canvas 232 out of the winding device 2 of the box 1 until the length of the canvas is enough to cover the motorcyclist and his companion. Close the upper cover 11 and button up the spring buckle 112 of the upper cover 11 to the T-shaped block 111 which is one the through the gap 239 of the canvas 232. And then, open the two short zippers 234 so as to pull the rainhats 237 out of the bags 238. As to the two front sleeves 236 sawn having their two ends sawn with two short flexible bands, they are very convenient for the arms of the motorcyclist to move, as shown in FIG. 5.

Figure 6:
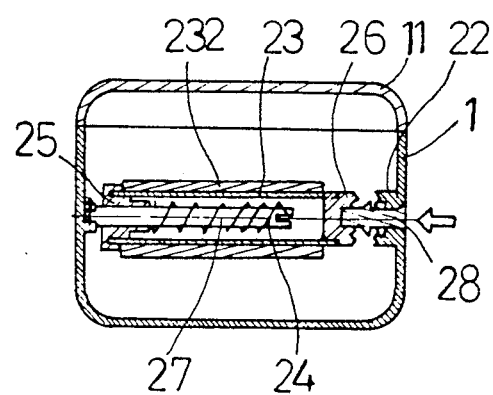
FIG. 6 is a view showing the rolled-up movement of the winding device of the present invention.

When the canvas 232 is to be rolled up, first open the upper cover 11 and press the push bar 28 on the right side of the box 1 leftwards so that the right shaft will also be moved leftwards. The gear teeth 263 of the right shaft sleeve 26 and the gear teeth 221 of the fixed shaft sleeve 22 will be separated accordingly. At this moment, the tight spring 24 of the reel 23 will roll up the canvas 232 into the box 1, as shown in FIG. 6.

While the preferred embodiments of the invention have been described above, it will be recognized and understood that various modifications may be made therein and the appended claims are intended to cover all such modifications which may fall within the spirit and scope of the invention.

What is claimed is:

1. A shading cover for motorcycles comprising:
 a box being set on the rear seat of a motorcycle and having an upper cover on its top, a T-shaped block on its front and a spring buckle which is on the front of said upper cover and just to the opposite side of said T-shaped block; and
 a winding device having an U-shaped block on the left inside wall of said box and a fixed shaft sleeve on the right inside wall of said box, by which an assemblage of a reel with a canvas, a spring, a left shaft sleeve, a right shaft sleeve, a cross bar and a push bar can be firmly fixed between said U-shaped block and said fixed shaft sleeve;
the improvement which comprises:
said canvas being rolled up onto said reel and having a long flexible band sawn on the lower edge of said canvas, a long zipper with an additional canvas piece sawn on the upper front of said canvas, two short zippers with bags and rainhats sawn on the upper middle partof said canvas, and two canvas sleeves with short flexible bands placed on both sides of said canvas so that said canvas can be used as a sun shade and a raincoat.

* * * * *